United States Patent [19]

Okita et al.

[11] Patent Number: 4,671,754
[45] Date of Patent: Jun. 9, 1987

[54] APPARATUS FOR MANUFACTURING POROUS POLYTETRAFLUOROETHYLENE MATERIAL

[75] Inventors: Koichi Okita; Shinichi Toyooka; Shigeru Asako; Katsuya Yamada, all of Osaka, Japan

[73] Assignee: Sumitomo Electric Industries, Ltd., Osaka, Japan

[21] Appl. No.: 814,945

[22] Filed: Dec. 31, 1985

Related U.S. Application Data

[62] Division of Ser. No. 594,044, Mar. 28, 1984.

[51] Int. Cl.⁴ ............................................. B29C 55/00
[52] U.S. Cl. ...................................................... 425/66
[58] Field of Search ............... 264/127; 425/66; 432/8, 432/59

[56] References Cited

U.S. PATENT DOCUMENTS

| | | | |
|---|---|---|---|
| 2,752,321 | 6/1956 | Heller | 264/127 |
| 2,776,465 | 1/1957 | Smith | 264/127 |
| 2,795,054 | 6/1957 | Bowen | 432/8 |
| 2,938,234 | 5/1960 | Slade | 264/127 |
| 3,090,075 | 5/1963 | Provenzano et al. | 264/127 |
| 4,104,394 | 8/1978 | Okita | 264/127 |
| 4,110,392 | 8/1978 | Yamazaki | 264/127 |
| 4,207,058 | 6/1980 | Petersohn et al. | 432/59 |
| 4,234,535 | 11/1980 | Okita | 264/127 |
| 4,255,136 | 3/1981 | Suzuki et al. | 432/59 |
| 4,553,929 | 11/1985 | Kanatani et al. | 432/8 |

FOREIGN PATENT DOCUMENTS 911831  11/1962  United Kingdom ............... 432/8

Primary Examiner—Willard E. Hoag
Attorney, Agent, or Firm—Sughrue, Mion, Zinn, Macpeak and Seas

[57] ABSTRACT

Apparatus for manufacturing a porous polytetrafluoroethylene material comprising extruding or rolling or a process consisting of the both an unsintered polytetrafluoroethylene mixture containing a liquid lubricant, and carrying out simultaneously next four steps of (a) evaporating a liquid lubricant, (b) stretching the molded articles in an unsintered condition, (c) sintering the same in a stretched condition, and (d) stretching the same in a sintered condition at an atmospheric temperature of more than 390° C. to obtain mechanical strengths such as a Young's modulus of more than 10000 kg/cm², and a matrix tensile strength of more than 1100 kg/cm².

1 Claim, 6 Drawing Figures

APPARATUS FOR MANUFACTURING POROUS POLYTETRAFLUOROETHYLENE MATERIAL

This is a division of application Ser. No. 594,044, filed 3/28/84.

BACKGROUND OF THE INVENTION

This invention relates to a method for manufacturing a porous polyetetrafluoroethylene material with high mechanical strength and more particularly to improvement in the economization of energy required for steps for removing a liquid lubricant, stretching and sintering the article.

The invention also releates to an apparatus for use in such method.

A porous polytetrafluoroethylene (hereinafter referred to "PTFE") material takes advantage of excellent heat resistance, chemical resistance, electric insulation and repellency of PTFE and is used in various filters, diaphragms and other waterproof gas-permeable materials, insulating materials for cables and sealing materials or the like.

Various methods for manufacturing a porous PTFE material have been well known. Among others, what is commercially appealing to the market is a stretching process for making porous PTFE whose basic idea is disclosed in Japanese Patent Publication No. 13560/67. In the first step of the process, powdered PTFE and a liquid lubricant are mixed and the mixture is shaped by a paste extrusion and a calender rolling or a combination thereof to obtain an unsintered molded article in the form of a film, tube or a rod and the like. The second and subsequent steps comprises: (1) eliminating the liquid lubricant contained in the molded article by evaporation or extraction, (2) rendering the molded article porous by strentching, and (3) sintering the porous article at a temperature higher than the melting point of PTFE to fix the porous structure. The reason why the second and subsequent steps are thus subdivided is as follows.

Stretching of molded PTFE containing a liquid lubricant at a temperature heretofore employed (from room temperature to a temperature lower than the crystalline melting point of PTFE) fails to lead to uniform stretching due to the action of interfacial tension of the liquid lubricant and give rise to a porous structure heterogeneous in pore size distribution. The sintering step must be carried out at a temperature higher than the crystalline melting point of PTFE. However, this step has been taken separately from the stretching step since the stretching has heretofore been carried out mostly at a temperature lower than the crystalline melting point of PTFE.

It has been customary to divide the process into unit steps to be carried out at different temperatures and different speeds, thus requiring much time and energy for processing and wasting much labor.

SUMMARY OF THE INVENTION

It is, therefore, an object of the present invention to provide a method for manufacturing PTFE, which enables one to carry out eliminating of lubricants, stretching and sintering in one step in a temperature not lower than 430° C., thereby eliminating the second and subsequent steps which have heretofore been employed.

Another object of the invention is to provide an apparatus for manufacturing PTFE, thereby greatly reducing processing time and saving energy required for the production of the porous PTFE material.

As a result of extensive researches into temperature, speed and other operative conditions in the stretching and sintering steps, it has been found that when an unsintered PTFE molded material containing a liquid lubricant is stretched at a temperature of not lower than 390° C. under the conditions under which a temperature distribution is precisely controlled, removal of the lubricant by evaporation can proceed simultaneously with stretching and sintering can also be carried out simultaneously with stretching after sintering. Through further researches on the conditions under which the steps are readily carried out, it has now been found that the method of the present invention can proceed advantageously by employing an oven circulating hot air as a control system for temperature distribution and providing in the furnace a catalyst which facilitates the combustion of the vaporized lubricant.

The present invention is based on the above findings and provides a method for manufacturing a porous polytetrafluoroethylene materials, comprising molding a mixture of an unsintered polytetrafluoroethylene and a liquid lubricant into an article by extruding and rolling, and then by simultaneously carrying out four steps of (a) removing the liquid lubricant by evaporation, (b) stretching the article in an unsintered condition, (c) sintering the article in a stretched condition, and (d) stretching the article in a sintered condition at a temperature of more than 390° C. to obtain a sintered porous polytetrafluoroethylene material having a Young's modulus of more than 10,000 kg/cm$^2$, and a matrix tensile strength of more than 1,100 kg/cm$^2$.

BRIEF DESCTIPTION OF THE DRAWINGS

DETAILED DESCRIPTION OF THE INVENTION

Figure 1:
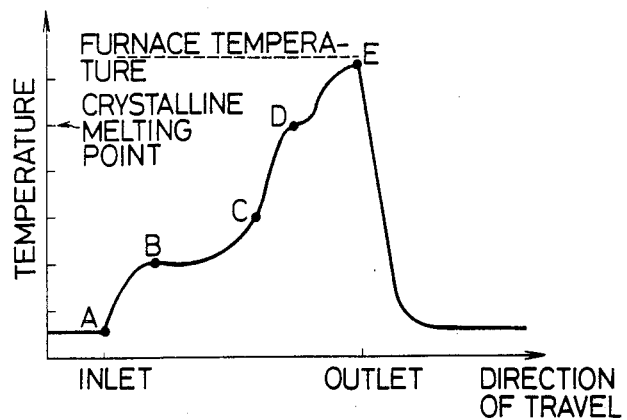
FIG. 1 is a graph schematically representing the manner in which the temperature is raised in the furnace.

When the unsintered PTFE molded article enters into a temperature not lower than the crystalline melting point of PTFE, the temperature of molded PTFE increases with simultaneous initiation of the evaporation of the liquid lubricant, resulting in that PTFE is maintained at a temperature less than the boiling point of the liquid lubricant due to absorption of heat of vaporization. Under such condition, tension is applied to molded PTFE so that its stretching proceeds within a limited range in an unsintered condition and proceeds to increase the surface area where the liquid lubricant has been removed. Increasing the surface area facilitates the evaporation of the liquid lubricant still left in the molded article. That is, porosification and evaporation of the liquid lubricant are simultaneously achieved. After the liquid lubricant has been evaporated thoroughly, the temperature of PTFE gradually increases and sintering starts when it reaches crystalline melting point of PTFE. PTFE maintains higher viscosity at a temperature not lower than the crystalline melting point and develops a fibruous structure when stretched by tension applied from the both ends thereof. The process is scehmatically shown in FIGS. 1 to 5. FIG. 1 shows a temperature profile in the stage where the temperature is increased. When the molded article at room temperature reaches an inlet A of the furnace, it is gradually heated and its temperature is elevated to the initial boiling point B of the liquid lubricant, where the rate of the increase in the temperature becomes to reduce due to heat of vaporization. Further, when the temperature of the molded article reaches a dry distrillation point C' of lubricant, where the rate of increase in the temperature is elevated and the temperature reaches the crystalline melting point of PTFE. Since the temperature of the furnace as set is further higher, the article absorbs a certain amount of heat in tis crystalline melting temperature, and finally its temperature becomes closer to the temperature of the furnace.

Figure 2:
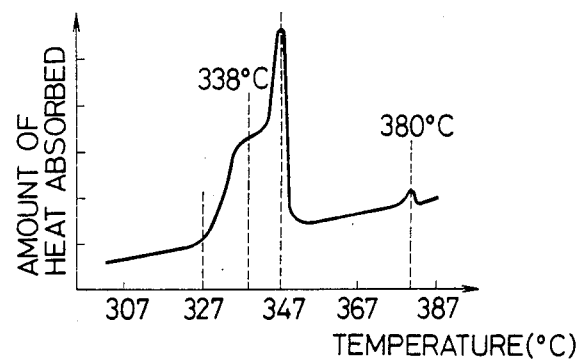
FIG. 2 shows a graph of differential thermal spectrum in the proximity of the crystalline melting point.

Referring to FIG. 2 showing data of differential thermal analysis of the unsintered PTFE molded article in the proximity of crystalline melting point, the endothermic curve shows a peak at a temperature of 348° C. and a shoulder at a temperature of 338° C. and further a small peak in the proximity of 380° C. These peaks are depended on the crystalline structure formed when PTFE was polymerized. On the other hand, after sintering, the above-described peaks in the endothermic curve reduce but instead a sharp peak appears at a temperature of 327° C. This means that the crystalline structure is varied before and after sintering step, and it is obvserved that the endothermic peak is shifted to the side of high temperature when the rate of increase and decrease in the temperature is higher.

Figure 3:
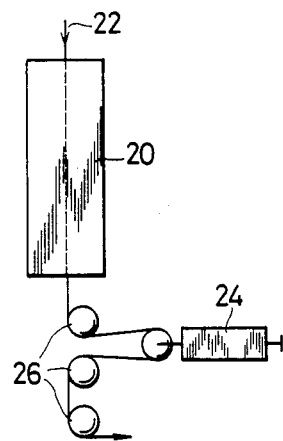
FIG. 3 is a schematical diagram showing the manner in which stretched tension is measured in the furnace.

FIG. 3 is schematical diagram showing how much tension is applied to the molded article in a steady state in the furnace where the liquid lubricant is removed by evaporation, the article is stretched in an unsintered condition, it is sintered, and it is stretched after sintering. In this instance, a tension meter using a strain gauze is coupled to a pulley to continuously record the stress loaded on the opposite ends of PTFE in the furnace.

Figure 4:
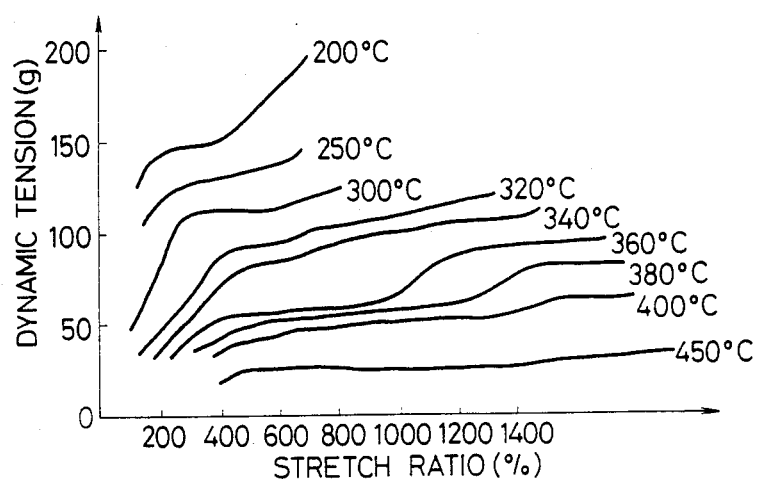
FIG. 4 is a graph showing the result of measurement of the tension.

FIG. 4 is a graph representing a dynamic tension curve when a stretch ratio is varied at a constant furnace temperature while the article is supplied to the furnace at a speed of 3 m/min. Measurements are performed at furnace temperatures ranging from 200° C. to 450° C.

Figure 5:
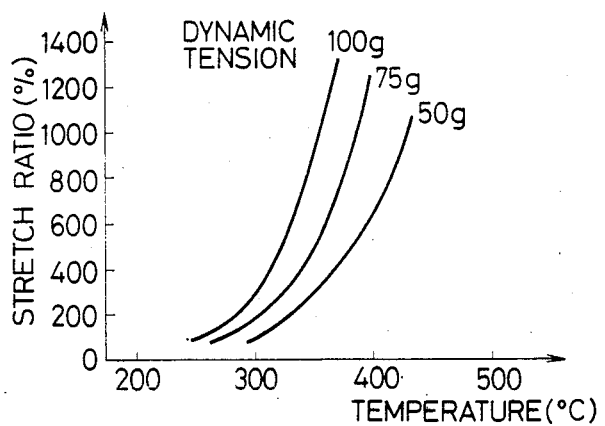
FIG. 5 is a graph showing a relation between temperature and stretching ratio of PTFE under a certain tension.

FIG. 5 is a graph showing a relation between the furnace temperature and stretch ratio under a certain constant dynamic tension, obtained from the graph in FIG. 4.

It is understood from FIG. 5 that if the PTFE molded article containing the liquid lubricant enters into the furnace as shown in FIG. 1 under conditions under which, for example, dynamic tension is exerted to load the article a stress of 100 g, little stretching occurs between the points A and B in FIG. 1 but stretching of not exceeding about 100% occurs at the point C at about 250° C. However, the article is subjected to a higher temperature as high as up to about 350° C. between the points C and D and then stretched up to 800%. Between the points D and E, if the upper limit of the furnace temperature set is, for example, 400° C., stretching of not lower than 1400% is achieved simultaneously with the sintering. It is, of course, a normal procedure to predetermine the stretch ratio at the top and the bottom of the furnace so that the dynamic tension is varied according to that ratio and the stretch ratios shown at various temperatures are changed accordingly. However, it has been discovered during repeated tests that when the furnace temperature was set, for example, 400° C. in excess of the endothermic peak shown in FIG. 2 (380° C.), the porous PTFE material had greater mechanical properties, particularly, Young's modulus and matrix tensile strentth. More specifically, the furnace temperature which was set at 380° C. or less may not satisfy either Young's modulus of not lower than 10000 kg/cm$^2$ or matrix tensile strength of not lower than 1100 dg/cm$^2$. However, the furnace temperature set at 390° C. or more may satisfy both the requirements, and the self-supported porous PTFE material may be obtained convenient to handle.

It is also confirmed that the PTFE molded article not containing a liquid lubricant is not qualified to satisfy Young's modulus of not lower than 10000 kg/cm$^2$ and matrix tensile strength of not lower than 1100 kg/cm$^2$ when supplied to the furnace.

Although the physical background of the method according to the invention is still unclear, it is believed, though not sticked to, that the phenomenon relates to a rate of temperature increase till a temperature above the endothermic peak is reached and the rate of temperature decrease once such a high temperature is reached.

The method of the present invention may be suitably applicable to the various articles in the form of a film, tube or rod.

Liquid lubricants which can be mixed with PTFE include those which are capable of wetting the surface of PTFE and capable of being evaporated at a temperature not higher than the melting temperature of PTFE.

Preferred lubricants include those having a boiling point not higher than 260° C. may be suitably used as it is readily evaporated from the molded article. Generally, petroleum hydrocarbons are used as they are easy to handle and reasonable in price.

The furnace temperature at which the invention is carried out must be not lower than 390° C. Although the crystalline melting point of PTFE is 347° C., it is required to use a temperature exceeding the crystalline melting point of 380° C. if it is desired to satisfy higher Young's modulus and matrix tensile strength.

On the other hand, the furnace temperature affects the rate of increase in the temperature of PTFE molding. More specifically, as the furnace temperature is incrased to more than 450° C. or 500° C., simultaneous operation of removal of the liquid lubricant, stretching and sintering of PTFE can be carried out at a higher speed. According to the present invention, it has now been confirmed that the method may be carried out so long as the temperature distribution within the furnace is controlled within the range of not more than 30° C. The higher the furnace temperature, the more accurate the temperature distribution. The higher accuracy of temperature allows PTFE to be predetermined high speed, homogeneous heating and cooling. With low accuracy, fluctuations are observed in melting of crystals and recrystallization, which tend to cause microbreakage during the treatment and result in fluctuations in the physical properties of the porous material. According to the present invention, it has been found that the oven which is adopted to circulate a hot air at a high speed to homogenize the furnace temperature distribution is well suitable for heat means which controls the temperature with high accuracy in the high temperature atmosphere. Further, it has been also discovered that incorporation into the furnace, of a catalyst which facilitates oxidization of evaporated lubricant lessens a solvent concentration in the furnace atmosphere to maintain it below explosion limit, and that thermal energy by combustion is used to the best advantage so that energy cost is greatly deducted. Since the higher a circulating wind velocity is, the better a temperature distribution accuracy is improved in the furnace, more than 5 m/sec. wind velocity is preferable in a working temperature and 10–40 m/sec. wind velocity is more preferable. The velocity may be changed according to the shape of the molded article.

Next, an apparatus will be described hereinafter into which the invention is well embodied.

Figure 6:
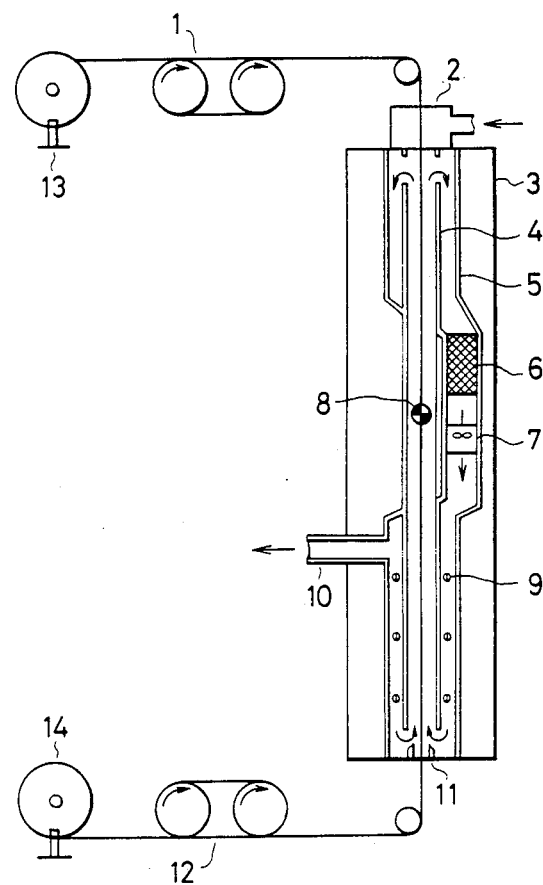
FIG. 6 is a schematical cross-sectional view of an apparatus used to carry out the method of the invention.

The basic structure of the apparatus is shown as in FIG. 6 and includes heat means, and supply and take-up means for the molded article. Heat means is a circulating hot air system. To this end, a double-cylinder piped furnace is employed wherein the molded article passes through an inner cylinder portion 4 and a heater is incorporated into an outer cylindrical portion 5. These two cylindrical portions are in connection with one another, and a hot air in the furnace is circulated at a constant flow rate by a fan 7. The furnace temperature is detected by a thermocouple 8 or the like disposed with the inner cylindrical portion as the center and is fed back by the heater for temperature control. The furnace temperature is influenced by an inflow of the air from the furnace inlet and outlet as well as a supplied speed of molded articles and combustion caloric energy of the lubricant.

A pressure box 2 at the furnace inlet and a nozzle 11 at the outlet are arranged to provide an adjustable mechanism which controls inflow of the air. A portion of the air in the furnace is forcibly discharged by an exhaust pipe 10 to maintain oxygen concentration required for combusiton in the furnace.

Catalysts are mounted on one or more places where the hot air is curculated. A platinum group catalyst is one of the catalysts having excellent oxidizing capacity and is suitably used for the purpose of the invention.

Means for supplying and taking-up the molded article will be described hereinafter. Basically, a take-up portion is required to be driven at a speed higher than a speed at which a supplying portion does since a stretching operation is interposed. When the molded article is, for example, a film, means is preferably in the form of a roll as is well suit therefor. When the molded article is a tube or a rod, means is preferably in the form of a pair of capstans with a groove to conform to the outer diameter. In addition a guide roll, a supply stand, take-up machine or various detectors are arranged as the case may be.

EXAMPLE 1

A liquid lubricant naphtha No. 5 (manufactured by Shell Petroleum Co.; boiling range 152°–197° C.) with 25 parts by weight was mixed with a PTFE fine powder F104 (manufactured by Daikin Kogyo Co., Ltd.) with 100 parts by weight and then extruded to a tube of the outer diameter of 3 mm, the inner diameter of 2 mm by a ram extruder. Next, the tube was subjected to simultaneous treatments such as removal of the lubricant and stretching, sintering the tube as shown in Table 1 at the temperature ranging from 350°–520° C. by the use of the apparatus shown in FIG. 6. As a result, a homogeneous porous tube was obtained in either case. The lubricant was fully evaporated and removed. An extracted residue (the tube was extracted in acetone to measure weight decrease before and after extraction) was shown less than 0.1 weight % in either case. Table 2 shows properties of porous tubes obtained, wherein strength characteristics of the tube obtained at the furnace temperature of more than 390° C. are matrix strength of 1100 kg/cm² and Young's modulus of more than 10000 kg/cm². On the other hand, the tube obtained at the atmospheric temperature of 360° C. results in that one of the value of either matrix tensile strength or Young's modulus in less than the afore-mentioned limit.

TABLE 1

| | Test Condition | | | |
|---|---|---|---|---|
| Test No. | Furnace Temperature (°C.) | Supply Speed (m/min.) | Take-up Speed (m/min.) | Stretching Ratio (%) |
| 1 | 360 | 1.5 | 6.0 | 300 |
| 2 | 400 | 3.0 | 6.0 | 100 |
| 3 | 400 | 3.0 | 12.0 | 300 |
| 4 | 420 | 3.5 | 38.5 | 1000 |
| 5 | 520 | 7.0 | 28.0 | 300 |
| 6 | 360 | 2.0 | 22.0 | 1000 |

TABLE 2

| | Characteristics of Porous Tube | | | | | |
|---|---|---|---|---|---|---|
| | Dimensions | | | | Property of Matter | |
| Test No. | Outer Dia. (mm) | Inner Dia. (mm) | Porosity (%) | Bubbling Point (kg/cm²) | Matrix Tensile Strength (kg/cm²) | Young's Modulus |
| 1 | 2.2 | 1.5 | 65 | 0.32 | 825 | 8000 |
| 2 | 2.3 | 1.7 | 42 | 1.20 | 1150 | 10500 |
| 3 | 2.2 | 1.6 | 68 | 0.43 | 1340 | 11000 |
| 4 | 2.3 | 1.7 | 82 | 0.18 | 1240 | 14000 |
| 5 | 2.4 | 1.9 | 76 | 0.22 | 1200 | 20000 |
| 6 | 2.1 | 1.6 | 86 | 0.15 | 1150 | 7000 |

*Calculation is made according to the following formula
$$FM = FR \times \frac{2.2}{dR}$$
wherein FM: matrix tensile strengh kg/mm².
FR: actual tensile strength of porous sample kg/mm².
dR: apparent specific density of porous sample.

EXAMPLE 2

A liquid lubricant naphtha No. 5 with 26 parts by weight was mixed with a PTFE fine powder F104 with 100 parts by weight and then extruded to give a rod of the outer diameter of 25 mm by a ram extruder. The rod was further rolled out to a film measured in the width of 650 mm and the thickness of 0.25 mm. The film was subjected to simultaneous treatments such as removal of the lubricant and stretching, sintering the film under a condition as shown in Table 3 by the use of the apparatus having a supply stand, a guide roll, and a take-up machine suitable for the film. Characteristics of the porous film as obtained are shown in Table 4 from which it is understood that the film is obtained with a higher strength and sufficient permeability.

TABLE 3

| | Test Condition | | | |
|---|---|---|---|---|
| Test No. | Furnace Temperature (°C.) | Supply Speed (m/min.) | Take-up Speed (m/min.) | Stretching Ratio (%) |
| 7 | 350 | 2.0 | 12.0 | 500 |
| 8 | 400 | 4.0 | 12.0 | 200 |
| 9 | 400 | 4.0 | 24.0 | 500 |
| 10 | 400 | 4.0 | 44.0 | 1000 |

TABLE 3-continued

| | Test Condition | | | |
|---|---|---|---|---|
| Test No. | Furnace Temperature (°C.) | Supply Speed (m/min.) | Take-up Speed (m/min.) | Stretching Ratio (%) |
| 11 | 540 | 10.0 | 30.0 | 200 |
| 12 | 540 | 10.0 | 60.0 | 500 |
| 13 | 350 | 3.0 | 33.0 | 1000 |

TABLE 4

| | Characteristics of Porous Film | | | | |
|---|---|---|---|---|---|
| Test No. | Dimension Film Thickness (mm) | Porosity (%) | Permeability (Gurley sec.) | Matrix Tensile Strength in Longitudinal Direction (kg/cm$^2$) | Young's Modulus (kg/cm$^2$) |
| 7 | 0.19 | 71.7 | 4.1 | 1200 | 7500 |
| 8 | 0.21 | 46.5 | 48.2 | 1120 | 11000 |
| 9 | 0.20 | 72.1 | 6.5 | 1150 | 10900 |
| 10 | 0.19 | 84.7 | 2.0 | 1360 | 13000 |
| 11 | 0.19 | 68.5 | 9.4 | 1270 | 15000 |
| 12 | 0.18 | 80.0 | 4.5 | 1460 | 17000 |
| 13 | 0.17 | 89.0 | 1.5 | 1200 | 6500 |

For production of the PTFE porous materials the three individual steps or processes have been heretofore requied, such as removal of the liquid lubricant, and stretching and sintering of the molded article to botain the porous materials from the paste extruded materials. According to the present invention, these three steps are performed simultaneously at one step and greatly reduce a process instrument, time and energy and labor.

While the invention has been described in detail and with reference to specific embodiments thereof, it will be apparent to one skilled in the art that various changes and modifications can be made therein without departing from the spirit and scope thereof.

What is claimed is:

1. An apparatus of manufacturing a porous polytetrafluoroethylene porous material from an unsintered polytetrafluororethyulene containing a liquid lubricant which is subjected to four steps, simultaneously carried out, of evaporating the lubricant, stretching the molded material in an unsintered condition, sintering the same in a stretched condition, and stretching the same in a sintered condition, said apparatus comprising a hot furnace including a double cylinder piped furnace having an inner cylinder part through which a molded material passes and an outer cylinder part in which a heater is incorporated, said two cylinder parts being coupled to one another by the both ends thereof, means for circulating hot air through said two cylinder parts in series, means for detecting a furnace temperature, means for adjusting an inflow of the air at an inlet and an outlet of the furnace, means for forcibly exhausting a portion of the furnace hot air, a catalyst disposed within said outer cylinder part for facilitating oxidation of the vaporized lubricant, and means for supplying the molded article to the furnace, and means for actuating take-up means at a speed more than the speed at which the molded article is supplied.

* * * * *